US012637544B2

(12) United States Patent
Chae et al.

(10) Patent No.: US 12,637,544 B2
(45) Date of Patent: May 26, 2026

(54) UV CURABLE SILICONE COMPOSITION AND CURED PRODUCT THEREOF

(71) Applicants: Duroptix Materials Kabushiki Kaisha, Tokyo (JP); DuPont Specialty Materials Korea Ltd., Cheonan-si (KR)

(72) Inventors: Jung Hye Chae, Hwaseong-si (KR); Shunya Takeuchi, Chiba (JP); Rikuto Otsuka, Chiba (JP)

(73) Assignees: Duroptix Materials Kabushiki Kaisha, Tokyo (JP); Dupont Specialty Materials Korea Ltd., Cheonan-si (KR)

( * ) Notice: Subject to any disclaimer, the term of this patent is extended or adjusted under 35 U.S.C. 154(b) by 871 days.

(21) Appl. No.: 17/806,414

(22) Filed: Jun. 10, 2022

(65) Prior Publication Data

US 2022/0403115 A1      Dec. 22, 2022

(30) Foreign Application Priority Data

Jun. 16, 2021      (JP) ................................. 2021-100108

(51) Int. Cl.
C08G 77/20 (2006.01)
C08K 13/02 (2006.01)

(52) U.S. Cl.
CPC .............. C08G 77/20 (2013.01); C08K 13/02 (2013.01)

(58) Field of Classification Search
None
See application file for complete search history.

(56) References Cited

U.S. PATENT DOCUMENTS

| | | | | |
|---|---|---|---|---|
| 3,661,744 A | * | 5/1972 | Kehr ....................... | C08G 71/00 |
| | | | | 428/419 |
| 4,591,608 A | * | 5/1986 | Okinoshima ............. | C08K 5/07 |
| | | | | 522/99 |
| 4,808,638 A | * | 2/1989 | Steinkraus .............. | C08G 75/12 |
| | | | | 522/167 |
| 4,810,731 A | * | 3/1989 | Hida ........................ | C08L 83/08 |
| | | | | 528/21 |
| 4,921,880 A | * | 5/1990 | Lee ....................... | C08K 5/5415 |
| | | | | 528/901 |
| 4,946,874 A | * | 8/1990 | Lee ....................... | C03C 25/106 |
| | | | | 522/146 |
| 5,100,993 A | | 3/1992 | Hida et al. | |

| | | | | |
|---|---|---|---|---|
| 5,158,988 A | * | 10/1992 | Kurita ....................... | C08K 5/53 |
| | | | | 528/30 |
| 8,716,362 B2 | | 5/2014 | Ono et al. | |
| 8,865,787 B2 | * | 10/2014 | Sakamoto .................. | C09J 5/00 |
| | | | | 522/75 |
| 9,732,239 B2 | | 8/2017 | Clapp et al. | |
| 9,994,754 B2 | * | 6/2018 | Clough .................... | C08L 83/04 |
| 10,829,639 B2 | * | 11/2020 | Ogawa ...................... | C08K 5/14 |
| 11,535,714 B2 | * | 12/2022 | Kao .......................... | C08K 5/37 |
| 11,781,016 B2 | * | 10/2023 | Takeuchi ............... | C08K 5/132 |
| | | | | 522/99 |
| 12,104,061 B2 | * | 10/2024 | Takeuchi ............... | C08K 5/132 |
| 12,371,534 B2 | * | 7/2025 | Sugie ..................... | C08G 77/20 |
| 2018/0327594 A1 | * | 11/2018 | Ogawa ..................... | C08K 5/14 |
| 2020/0032111 A1 | | 1/2020 | Ogawa et al. | |
| 2021/0269642 A1 | * | 9/2021 | Takeuchi ............... | C08K 5/132 |

FOREIGN PATENT DOCUMENTS

| | | | | | |
|---|---|---|---|---|---|
| GB | 1051687 A | * | 12/1966 | ........ | B01D 19/0409 |
| JP | H02245060 A | | 9/1990 | | |
| JP | H0662855 B2 | * | 9/1994 | | |
| JP | 2002371261 A | | 12/2002 | | |
| JP | 4335038 B2 | | 9/2009 | | |
| JP | 2013253179 A | | 12/2013 | | |
| JP | 2015149379 A | | 8/2015 | | |
| JP | 2016060782 A | | 4/2016 | | |
| JP | 2016150958 A | | 8/2016 | | |
| JP | 6426023 B2 | * | 11/2018 | | |
| JP | 6530902 B2 | * | 6/2019 | | |
| JP | 2019-167544 A | | 10/2019 | | |
| JP | 2021100108 A | | 7/2021 | | |
| JP | 202431605 A1 | | 3/2024 | | |
| TW | 202132471 A | * | 9/2021 | ........... | H10H 20/854 |

(Continued)

OTHER PUBLICATIONS

Wang et al. Additive manufacturing of ceramics from preceramic polymers: A versatile stereolithographic approach assisted by thiol-ene click chemistry. Additive Manufacturing, 27, pp. 80-90 (2019). (Year: 2019).*

(Continued)

*Primary Examiner* — Sanza L. McClendon
(74) *Attorney, Agent, or Firm* — Ingrassia Fisher & Lorenz, LLP | IF&L

(57) ABSTRACT

The present invention relates to a UV curable silicone composition comprising at least one organopolysiloxane having at least two alkenyl groups per molecule; at least one mercapto functional organic compound having at least two thiol groups per molecule; at least one photopolymerization initiator; and at least one polymerization inhibitor comprising at least one alkoxylated polyol derived (meth)acrylate or at least one quinone derivative compound, and/or at least one antioxidant, wherein the composition comprises the photopolymerization initiator selected from intramolecular hydrogen abstraction type photopolymerization initiators, or the composition comprises the polymerization inhibitor.

10 Claims, No Drawings

(56)     References Cited

FOREIGN PATENT DOCUMENTS

| WO | 2017/155949 A1 | 9/2017 | |
| WO | 2017155919 A1 | 9/2017 | |
| WO | 2018223365 A1 | 12/2018 | |
| WO | WO-2019145273 A1 * | 8/2019 | .......... C08F 290/067 |
| WO | 2021102073 A1 | 5/2021 | |

OTHER PUBLICATIONS

Wikipedia contributors. (Mar. 23, 2025). Hydroquinone. In Wikipedia, The Free Encyclopedia. Retrieved 16:09, Apr. 2, 2025, from https://en.wikipedia.org/w/index.php?title=Hydroquinone&oldid=1281961137 (Year: 2025).*

Chiou et al. Rheology and Photo-Cross-Linking of Thiol-Ene Polymers. Macromolecules 1996,29,5368-5374 (Year: 1996).*

C. Knuth et al. Reactions of Thiols With Unsaturated Compounds. The Journal of Organic Chemistry 1954 19 (5), 845-850. (Year: 1954).*

* cited by examiner

UV CURABLE SILICONE COMPOSITION AND CURED PRODUCT THEREOF

CROSS-REFERENCE TO RELATED APPLICATIONS

This application claims priority pursuant to 35 U.S.C. 119(a) to Japan Patent Application No. 2021-100108, filed Jun. 16, 2021, which application is incorporated herein by reference in its entirety.

TECHNICAL FIELD

The present invention relates to a UV curable silicone composition and a cured product thereof.

BACKGROUND ART

Curable silicone compositions are utilized in a wide range of industrial fields because they form cured products having excellent heat resistance, cold resistance, electrical insulation, weather resistance, water repellency, and transparency. The cured product of such a curable silicone composition is also suitable as a sealant for optical materials and semiconductor devices because it is hardly discolored as compared with other organic materials, and physical properties are less deteriorated.

Among curable silicone compositions, UV curable silicone compositions are utilized for some products since they can avoid problems caused from heat for curing silicone compositions. In UV curable silicone compositions, mercapto functional compounds are formulated because they can provide the cured products with a high hardness.

So far, some applications for UV curable silicone compositions comprising mercapto functional compounds have been published.

For example, U.S. Pat. No. 9,732,239 discloses a composition comprising:

(A) a mercapto-functional polyorganosiloxane having the unit formula [(CH3)3SiO1/2]x[(CH3)2SiO]y[R(CH3) SiO]z, wherein x is about 0.01 to about 0.1, y is about 0 to about 0.94, z is about 0.05 to about 0.99, and at each occurrence R is independently a mercapto(C1-30) hydrocarbyl group;

(B) at least one of (B1) a polyorganosiloxane comprising at least two aliphatic unsaturated carbon-carbon bonds, and (B2) an organic molecule comprising at least two aliphatic unsaturated carbon-carbon bonds;

(C) a filler, where the filler is present in 20 wt. % or more based on the weight of the composition; and (D) a photoinitiator; wherein the composition is shear-thinning and UV-curable.

Also, JP-A-2019-167544 discloses a UV curable silicone resin composition including:

(A) a specific linear polyorganosiloxane containing at least one aliphatic unsaturated group;

(B) a polyorganosiloxane containing a mercaptoalkyl group bonded to a silicon atom and having a viscosity at 23° C. of 10 to 10,000 cP;

(C) an acylphosphine oxide compound selected from 2,4,6-trimethylbenzoyl-diphenylphosphine oxide and bis(2,4,6-trimethylbenzoyl)-phenylphosphine oxide;

(D) a benzotriazole compound selected from C7-9 alkylesters of 3-(2H-benzotriazol-2-yl)-4-hydroxy-5-tert-butylbenzenepropionic acid; and (E) a hindered amine compound selected from bis(1-octyloxy-2,2,6,6-tetramethyl-4-piperidyl) sebacate, bis (1,2,2,6,6-pentamethyl-4-piperidyl)sebacate, and methyl-1,2,2,6,6-pentamethyl-4-piperidyl sebacate, in which the ratio of the number of the mercaptoalkyl groups in the component (B) to the number of the aliphatic unsaturated groups in the component (A) is 0.1 to 10; and the amount of component (C) is 0.08 to 0.25% by weight, the amount of component (D) is 0.5 to 5.0% by weight, and the amount of component (E) is 0.1 to 0.5% by weight, with regard to 100% by weight of the total of the components (A) to (E).

In addition, WO2017/155919 discloses a photocurable silicone composition comprising:

(A) 100 parts by mass of an organopolysiloxane comprising at least one alkenyl group;

(B) from 3 to 30 parts by mass of an organic compound having at least two ether bonds and at least one aliphatic carbon-carbon double bond in a molecule;

(C) a compound having at least two thiol groups in a molecule, in an amount such that the amount of the thiol groups in the present component is from 0.2 to 2.0 mol per 1 mol of the total aliphatic carbon-carbon double bonds in the present composition;

(D) from 0.05 to 1.0 part by mass of a photoradical initiator having a phosphorus atom; and (E) from 0.001 to 1.0 part by mass of a hindered phenol compound.

Furthermore, US-A-2020/0032111 discloses a photocurable liquid silicone composition comprising:

(A) a straight chain organopolysiloxane with a viscosity at 23° C. of 50 to 100,000 mPa·s, containing at least two alkenyl groups with 2 to 12 carbon atoms in a molecule, and not containing a mercaptoalkyl group;

(B) an organopolysiloxane with a viscosity at 23° C. of 10 to 10,000 mPa·s and having at least two mercaptoalkyl groups in a molecule, in an amount such that the amount of mercaptoalkyl groups in this component is 0.2 to 3 moles with regard to 1 mole of alkenyl groups in component (A);

(C) a branched chain organopolysiloxane containing siloxane units represented by the formula: R3SiO3/2 where R3 represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms and/or siloxane units represented by the formula: SiO4/2, wherein the molar ratio of siloxane units represented by the formula: R3SiO3/2 and the siloxane units represented by the formula: SiO4/2 of all of the siloxane units in component (C) is at least 0.5, and alkenyl groups and mercaptoalkyl groups are not included;

(D) a photo radical initiator containing a phosphorus atom; and (E) a hindered phenol compound; wherein the amount of component (C) is 25 to 80 parts by mass, the amount of component (D) is 0.01 to 1.0 parts by mass, and the amount of component (E) is 0.001 to 1.0 parts by mass, with regard to 100 parts by mass of a total of component (A) through component (E).

However, for UV curable silicone compositions comprising mercapto functional compounds, there is a problem that a gelation of the composition may occur before a polymerization process starts, since the mercapto functional compounds are generally reactive. Furthermore, there is a problem that a coloration may occur during UV curing of the composition.

SUMMARY OF THE INVENTION

An objective of the present invention is to provide a UV curable silicone composition comprising at least a mercapto functional compound, which can suppress gelation of the composition.

Another objective of the present invention is to provide a UV curable silicone composition comprising at least mercapto functional compound, which can produce a clear cured silicone product.

Yet another objective of the present invention is to provide a UV curable silicone composition comprising at least mercapto functional compound, which can suppress a gelation of the composition and produce a clear cured silicone product.

The above objective of the present invention can be achieved by a UV curable silicone composition comprising:

(A) at least one organopolysiloxane having at least two alkenyl groups per molecule;

(B) at least one mercapto functional compound having at least two thiol groups per molecule;

(C) at least one photopolymerization initiator; and (D) (d-1) at least one polymerization inhibitor comprising at least one alkoxylated polyol derived (meth)acrylate or at least one quinone derivative compound, and/or (d-2) at least one antioxidant, wherein, (i) the composition comprises the (C) photopolymerization initiator selected from intramolecular hydrogen abstraction type photopolymerization initiators, or (ii) the composition comprises the (d-1) polymerization inhibitor.

The (B) mercapto functional compound may comprise primary or secondary thiol groups. The (B) mercapto functional compound may comprise a dithiol compound. The (C) photopolymerization initiator may comprise intramolecular hydrogen abstraction type or an oxyethoxy phenylacetyl derivatives. The (B) mercapto functional organic compound may be present in an amount of 3% by weight or more and 50% by weight or less relative to the total weight of the composition. The (d-2) antioxidant may comprise a hindered phenol-type antioxidant and/or thioester antioxidant.

The present invention also relates to a sealing agent or sheet film formed with the UV curable silicone composition according to the present invention.

The UV curable silicone composition according to the present invention can suppress a gelation of the composition and/or can produce a clear cured silicone product.

After diligent research, the inventors have surprisingly discovered that the gelation and/or coloration of UV curable silicone composition comprising at least one mercapto functional compound can be suppressed with a combination of a specific photoinitiator, a specific polymerization inhibitor and/or an antioxidant, and thus completed the present invention.

Thus, the composition according to the present invention is a UV curable silicone composition comprising:

(A) at least one organopolysiloxane having at least two alkenyl groups per molecule;

(B) at least one mercapto functional compound having at least two thiol groups per molecule;

(C) at least one photopolymerization initiator; and (D) (d-1) at least one polymerization inhibitor comprising at least one alkoxylated polyol derived (meth)acrylate or at least one quinone derivative compound, and/or (d-2) at least one antioxidant, wherein, (i) the composition comprises the (C) photopolymerization initiator selected from intramolecular hydrogen abstraction type photopolymerization initiators, or (ii) the composition comprises the (d-1) polymerization inhibitor.

In one aspect of the present invention, the composition according to the present invention is a UV curable silicone composition comprising:

(A) at least one organopolysiloxane having at least two alkenyl groups per molecule;

(B) at least one mercapto functional compound having at least two thiol groups per molecule;

(C) at least one photopolymerization initiator; and (d-1) at least one polymerization inhibitor comprising at least one alkoxylated polyol derived (meth)acrylate or at least one quinone derivative compound.

In another aspect of the present invention, the composition according to the present invention is a UV curable silicone composition comprising:

(A) at least one organopolysiloxane having at least two alkenyl groups per molecule;

(B) at least one mercapto functional compound having at least two thiol groups per molecule;

(C) at least one photopolymerization initiator; and (d-1) at least one polymerization inhibitor comprising at least one alkoxylated polyol derived (meth)acrylate or at least one quinone derivative compound, and (d-2) at least one antioxidant.

In this aspect, the polymerization inhibitor preferably comprises alkoxylated polyol derived (meth)acrylate, and/or the antioxidant preferably comprises at least one hindered phenol-type antioxidant comprising at least two thioester groups, i.e. thioester antioxidant, such as 2,4-bis [(octylthio) methyl)-o-cresol, which is available from BASF in the name of IRGANOX 1520L.

In this aspect, the amount of the (C) photopolymerization initiator is preferably 0.1% by weight or more, preferably 0.5% by weight or more, more preferably 0.7% by weight or more, and even more preferably 0.1% by weight or more, and may be 5% by weight or less, preferably 3% by weight or less, more preferably 2% by weight or less, and even more preferably 1.5% by weight or less, relative to the total weight of the composition.

In this aspect, the amount of the (d-2) antioxidant is preferably 0.1% by weight or more, preferably 0.3% by weight or more, more preferably 0.5% by weight or more, and even more preferably 0.7% by weight or more, and may be 5% by weight or less, preferably 3% by weight or less, more preferably 2% by weight or less, and even more preferably 1.5% by weight or less, relative to the total weight of the composition.

In yet another aspect of the present invention, the composition according to the present invention is a UV curable silicone composition comprising:

(A) at least one organopolysiloxane having at least two alkenyl groups per molecule;

(B) at least one mercapto functional compound having at least two thiol groups per molecule;

(C) at least one photopolymerization initiator selected from intramolecular hydrogen abstraction type photopolymerization initiators; and (d-1) at least one polymerization inhibitor comprising at least one alkoxylated polyol derived (meth)acrylate or at least one quinone derivative compound, and/or (d-2) at least one antioxidant.

Hereinafter, the composition, process, and use according to the present invention will be explained in a more detailed manner.

The UV curable silicone composition according to the present invention comprises (A) at least one organopolysiloxane having at least two alkenyl groups per molecule, (B) at least one mercapto functional organic compound having at least two thiol groups per molecule, and (C) at least one photopolymerization initiator. In addition, the UV curable silicone composition according to the present invention comprises (D) (d-1) at least one polymerization inhibitor comprising at least one alkoxylated polyol derived (meth) acrylate and/or (d-2) at least one antioxidant. Furthermore, The UV curable silicone composition according to the present invention comprises i) the (C) photopolymerization initiator selected from intramolecular hydrogen abstraction type photopolymerization initiators, or (ii) the (d-1) polymerization inhibitor. The components are described in a detailed manner below.

(A) Organopolysiloxane Having at Least Two Alkenyl Groups Per Molecule.

The UV curable silicone composition according to the present invention comprises at least one organopolysiloxane having at least two alkenyl groups per molecule as the component (A). The composition according to the present invention may comprise one type of the (A) organopolysiloxane or may comprise two or more types of the (A) organopolysiloxane in combination.

The (A) organopolysiloxane having at least two alkenyl groups per molecule may have a linear or resin structure. The term "linear" here means that the organopolysiloxane has a straight chain structure in the molecule and does not have a branched chain nor a branched structure. The term "resin" here means that the organopolysiloxane has a branched or three-dimensional network structure in the molecule.

The alkenyl group included in the component (A) may include C2-12 alkenyl groups, such as a vinyl, allyl, butenyl, pentenyl, hexenyl, heptenyl, octenyl, nonenyl, decenyl, undecenyl, and dodecenyl groups; and preferably a vinyl group.

Other silicon atom-bonded groups other than alkenyl groups included in component (A) may include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; C6-12 aryl groups such as phenyl, tolyl, xylyl and naphthyl groups; benzyl group; C7-12 aralkyl groups such as phenethyl, and phenylpropyl groups; and groups obtained by substituting some or all of the hydrogen atoms in these groups with halogen atoms such as fluorine, chlorine or bromine atoms. It should be noted that a small amount of hydroxyl group or alkoxy group such as methoxy or ethoxy group may be bonded to the silicon atom in the component (A), provided that this does not adversely affect the aim of the present invention. Preferably, the silicon atom-bonded groups other than alkenyl groups comprise a C1-12 alkyl group, in particular a methyl group, and a C6-12 aryl group, in particular a phenyl group. The component (A) may not include any thiol groups.

In one embodiment of the present invention, the (A) organopolysiloxane having at least two alkenyl groups per molecule can be organopolysiloxane resin which can be represented by the following formula (I):

$$(R1_3SiO_{1/2})_a(R1_2SiO_{2/2})_b(R1SiO_{3/2})_c(SiO_{4/2})_d$$
$$(XO_{1/2})_e \quad \text{average unit formula (I):}$$

in which, R1 indicates the same or different monovalent hydrocarbon, which can be optionally substituted with at least one halogen, wherein at least two of R1 per molecule represent alkenyl groups; X represents a hydrogen atom or an alkyl group; and $0 \leq a < 1$, $0 \leq b < 1$, $0 \leq c < 0.95$, $0 \leq d < 0.9$, $0 \leq e < 0.4$, $a+b+c+d=1.0$, and $c+d>0$ are satisfied.

The monovalent hydrocarbon for R1, which can be optionally substituted with at least one halogen, may include, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; C6-12 aryl groups such as phenyl, tolyl, xylyl and naphthyl groups; benzyl group; C7-12 aralkyl groups such as phenethyl, and phenylpropyl groups; and groups obtained by substituting some or all of the hydrogen atoms in these groups with halogen atoms such as fluorine, chlorine or bromine atoms. The monovalent hydrocarbon in R1 may include a small amount of hydroxyl group or alkoxy group such as a methoxy or ethoxy group, provided that this does not adversely affect the aim of the present invention. Preferably, the monovalent hydrocarbon in R1 represents a C1-12 alkyl group, in particular a methyl group, and a C6-12 aryl group, in particular a phenyl group.

In formula (I), X represents a hydrogen atom or an alkyl group. The alkyl group in X preferably represents a C1-3 alkyl group such as a methyl, ethyl, or propyl group.

In one embodiment of the present invention, in formula (I), a ranges preferably from $0.05 \leq a \leq 0.8$, more preferably in the range of $0.1 \leq a \leq 0.6$, and even more preferably in the range of $0.15 \leq a \leq 0.4$. In formula (I), b ranges preferably from $0 \leq b \leq 0.5$, more preferably from $0 \leq b \leq 0.3$, and even more preferably from $0 \leq b \leq 0.1$. In formula (I), c ranges preferably from $0.2 \leq c \leq 0.9$, more preferably from $0.4 \leq c \leq 0.85$, and even more preferably from $0.6 \leq c \leq 0.8$. In formula (I), d ranges preferably from $0 \leq d \leq 0.5$, more preferably from $0 \leq d \leq 0.3$, and even more preferably from $0 \leq d \leq 0.1$ In formula (I), e ranges preferably from $0 \leq e \leq 0.2$, more preferably from $0 \leq e \leq 0.1$, and even more preferably from $0 \leq e \leq 0.05$.

In this embodiment of the present invention, in formula (I), c is more than 0, i.e., the (A) organopolysiloxane resin comprises at least one T siloxane unit represented by (SiO3/2). In this embodiment, the (A) organopolysiloxane resin may or may not comprise a Q siloxane unit represented by (SiO4/2), however, it preferably does not comprise any Q units.

In another embodiment of the present invention, in formula (I), a ranges preferably from $0.1 \leq a \leq 0.8$, more preferably from $0.2 \leq a \leq 0.7$, and even more preferably from $0.3 \leq a \leq 0.6$. In formula (I), b ranges preferably from $0 \leq b \leq 0.5$, more preferably from $0 \leq b \leq 0.3$, and even more preferably from $0 \leq b \leq 0.1$. In formula (I), c ranges preferably from $0 \leq c \leq 0.5$, more preferably from $0 \leq c \leq 0.3$, and even more preferably from $0 \leq c \leq 0.1$. In formula (I), d ranges preferably from $0.1 \leq d \leq 0.8$, more preferably from $0.2 \leq d \leq 0.7$, and even more preferably from $0.3 \leq d \leq 0.6$. In formula (I), e ranges preferably from $0 \leq e \leq 0.2$, more preferably from $0 \leq e \leq 0.1$, and even more preferably from $0 \leq e \leq 0.05$.

In this embodiment of the present invention, in formula (I), d is more than 0, i.e., the (A) organopolysiloxane resin comprises at least one Q siloxane unit represented by (SiO4/2). In this embodiment, the (A) organopolysiloxane resin may or may not comprise a T siloxane unit represented by (SiO3/2), however, it preferably does not comprise any T units.

In another embodiment of the present invention, the (A) organopolysiloxane having at least two alkenyl groups per molecule can be linear organopolysiloxane which can be represented by the following formula (I-b):

$$(R13SiO1/2)a(R12SiO2/2)b(R1SiO3/2)c(SiO4/2)d$$
$$(XO1/2)e \qquad \text{average unit formula (I-b):}$$

in which, R1 indicates the same or different monovalent hydrocarbon, which can be optionally substituted with at least one halogen, wherein at least two of R1 per molecule represent alkenyl groups; X represents a hydrogen atom or an alkyl group; and $0 \leq a \leq 1$, $0 \leq b \leq 1$, $c=d=0$, $0 \leq e \leq 0.4$, and $a+b+e=1.0$ are satisfied.

In formula (I-b), the alkyl group in X preferably represents a C1-3 alkyl group such as methyl, ethyl, or propyl group.

In formula (I-b), a ranges are preferably from $0.0001 \leq a \leq 0.8$, more preferably from $0.001 \leq a \leq 0.6$, and even more preferably from $0.002 \leq a \leq 0.4$, b ranges are preferably from $0 \leq b \leq 0.9999$, more preferably from $0 \leq b \leq 0.999$, and even more preferably from $0 \leq 0.998$, and e ranges preferably from $0 \leq e \leq 0.2$, more preferably from $0 \leq e \leq 0.1$, and even more preferably from $0 \leq e \leq 0.05$.

In another embodiment of the present invention, the (A) organopolysiloxane having at least two alkenyl groups per molecule can be linear organopolysiloxane which can be represented by the following formula (I-c):

$$R13SiO(R12SiO)mSiR13 \qquad \text{average structural formula (I-c):}$$

in which, R1 indicates the same or different monovalent hydrocarbon, which can be optionally substituted with at least one halogen, wherein at least two of R1 per molecule represent alkenyl groups; and m ranges from 1 to 1,000.

In formula (I-c), m preferably ranges from 10 to 800, and more preferably from 50 to 700, and even more preferably ranges from 100 to 600.

In one preferred embodiment of the present invention, the linear organopolysiloxane of the component (A) can be linear dimethylpolysiloxane comprising dimethylvinylsiloxy groups at the both ends of the molecular chain.

In one embodiment of the present invention, the (A) organopolysiloxane comprises alkenyl groups at the end of the molecule. This means that the (A) organopolysiloxane comprises alkenyl groups at M siloxane units represented by (SiO1/2). The (A) organopolysiloxane may or may not comprise alkenyl groups at D siloxane units represented by (SiO2/2) and/or T units, however, it preferably does not comprise alkenyl groups at D or T units.

The amount of the alkenyl groups relative to the total amount of the silicon atom-bonded groups in the (A) organopolysiloxane is not particularly limited, but for example 1 mol % or more, preferably 0.1 mol % or more, more preferably 0.2 mol % or more, and in particular 0.3 mol % or more, and in general 40 mol % or less, preferably 30 mol % or less, more preferably 25 mol % or less, and in particular 20 mol % or less, relative to the total amount of the silicon atom-bonded groups. The amount of the alkenyl groups can be measured, for example, with analytical methods such as Fourier transform infrared spectroscopy (FT-IR) or nuclear magnetic resonance (NMR), or the following titration method.

The method for quantifying the amount of alkenyl groups in organopolysiloxane by the titration method will be described below. The content of alkenyl groups in organopolysiloxane can be accurately quantified by the titration method known as the Wijs method. The principle is described below. First, alkenyl groups present in organopolysiloxane raw materials and iodine monochlorides are subjected to an addition reaction as shown in Equation (1).

Next, by the reaction represented by Equation (2), iodine monochlorides in an excess quantity are reacted with potassium iodides so as to be released as iodines. The free iodines are then titrated with a sodium thiosulfate solution.

$$CH2=CH-+2ICl \rightarrow CH2I-CHCl-+ICl \text{ (excess quantity)} \qquad \text{Equation (1)}$$

$$ICl+KI \rightarrow I2+KCl \qquad \text{Equation (2)}$$

The amount of the alkenyl groups present in the organopolysiloxane can be quantified from the difference between the amounts of sodium thiosulfate required for the titration above and for a blank solution prepared separately.

In one preferred embodiment of the present invention, the (A) organopolysiloxane comprises at least one aryl group in the silicon atom-bonded groups. This means that at least one of R1 in formula (I), (I-b), and/or (I-c) may represent an aryl group. In one preferred embodiment of the present invention, the (A) organopolysiloxane comprises at least one aryl group at a D unit or T unit. The (A) organopolysiloxane may or may not comprise aryl groups at M unit, but preferably does not comprise any aryl groups at an M unit. The aryl group can be selected from C6-12 aryl groups such as a phenyl, tolyl, xylyl and naphthyl group.

In the case that the (A) organopolysiloxane comprises aryl groups, the content of the aryl groups in the (A) organopolysiloxane is not particularly limited, but in general 5 mol % or more, preferably 10 mol % or more, more preferably 15 mol % or more, even more preferably 20 mol % or more, and in particular 25 mol % or more, and in general 60 mol % or less, preferably 50 mol % or less, more preferably 40 mol % or less, even more preferably 35 mol % or less, and in particular 30 mol % or less, relative to the total amount of the silicon atom-bonded groups. The amount of the aryl groups can be measured, for example, with analytical methods such as Fourier transform infrared spectroscopy (FT-IR) or nuclear magnetic resonance (NMR).

In one another embodiment of the present invention, the (A) organopolysiloxane does not comprise any aryl groups in the silicon atom-bonded groups. In this embodiment, the (A) organopolysiloxane may be vinylmethylsiloxane resin.

As the specific examples of the vinylmethylsiloxane resin which can be used in the present invention, mention can be made of those represented by the following formula (V):

(V): wherein, R1 and R2 each independently represent a hydrocarbon group including an alkenyl group, wherein at least two of R2 are alkenyl groups, m represents an integer of 1 or more and n represents 0 or an integer of 1 to 5. The hydrocarbon and an alkenyl group in formula (V) are the same as those explained for the component (A) above.

In formula (V), m is preferably 1 to 20, more preferably 1 to 10, and still more preferably 1 to 5. The weight-average molecular weight of the vinylmethylsiloxane resin is not particularly limited, but is preferably 300 to 5,000, more preferably 300 to 2,500, and still more preferably 500 to 1,500. The weight-average molecular weight can be measured (in terms of polystyrene) using gel permeation chromatography (GPC).

As a commercial product of the vinylmethylsiloxane resin represented by formula (V) above, mention can be made of MTV-112 (trade name) manufactured by GELEST, INC.

The viscosity of the (A) organopolysiloxane is not particularly limited, but may be for example 5 mPa to 5,000 mPa at 25° C. The viscosity of organopolysiloxane components herein can be measured with a rotational viscometer compliant with JIS K7117-1.

The (A) organopolysiloxane may be present in an amount of 40% by weight or more, preferably 50% by weight or more, more preferably 55% by weight or more, and in particular 60% by weight or more, and may be present in an amount of 98% by weight or less, preferably 95% by weight or less, relative to the total weight of the composition.

(B) Mercapto Functional Compound Having at Least Two Thiol Groups Per Molecule

The UV curable silicone composition according to the present invention comprises at least one mercapto functional compound having at least two thiol groups per molecule as the component (B). The composition according to the present invention may comprise one type of the (B) mercapto functional compound, or may comprise two or more types of the (B) mercapto functional compound in combination.

The (B) mercapto functional compound may be selected from mercapto functional organic compounds having at least two thiol groups per molecule and mercapto functional silicone compounds having at least two thiol groups per molecule.

The (B) mercapto functional compound may comprise primary or secondary thiol groups.

The (B) mercapto functional compound may comprise a dithiol compound.

In the mercapto functional organic compounds, the term "organic compound" here means compounds having a C—C backbone structure. The composition according to the present invention may comprise one type of the mercapto functional organic compound, or may comprise two or more types of the mercapto functional organic compounds in combination.

The mercapto functional organic compound may have 2 to 6 thiol groups, preferably 2 to 4 thiol groups, and more preferably 2 to 3 thiol groups. In particular, the mercapto functional organic compound comprises at least one dithiol compound.

The type of the thiol group in the mercapto functional organic compound may be selected from a primary thiol, a secondary thiol, and a tertiary thiol. Preferably, the mercapto functional organic compound comprises one or more second thiol groups as the thiol group.

In particular, the mercapto functional organic compound may be dithiol compounds having two secondary thiol groups.

The weight average molecular weight (Mw) of the mercapto functional organic compounds is not particularly limited, but is in general 100 or greater, preferably 150 or greater, more preferably 200 or greater, and even more preferably 250 or greater, and is in general 1,000 or less, preferably 800 or less, more preferably 600 or less, and even more preferably 400 or less. The weight average molecular weight can be measured by, for example, gel permeation chromatography (GPC).

A thiol group equivalent, i.e. a value obtained by dividing the molecular weight of the thiol compound by the number of thiol groups (the molecular weight of the thiol compound/ the number of thiol groups —SH of the thiol compound), of the mercapto functional organic compounds is not particularly limited, but in general is 50 or greater, preferably 100 or greater, and more preferably 125 or more, and is in general 500 or less, preferably 400 or less, and more preferably 300 or less.

As examples of secondary dithiol compounds, mention can be made of, for example, 1,4-bis (3-mercaptobutyloxy) butane, bis(1-mercaptoethyl) phthalate, bis(2-mercaptopropyl) phthalate, bis(3-mercaptobutyl) phthalate, ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), ethylene glycol bis(4-mercaptovalerate), propylene glycol bis(4-mercaptoisovalerate), diethylene glycol bis(4-mercaptovalerate), butanediol bis(4-mercaptovalerate), octanediol bis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), and octanediol bis(3-mercaptovalerate).

As examples of secondary trithiol compounds, mention can be made of, for example, trimethylolpropane tris(3-mercaptobutyrate), trimethylolpropane tris(2-mercaptopropionate), trimethylolpropane tris(2-mercaptopropionate), trimethylolpropane tris(4-mercaptovalerate), trimethylolpropane tris(3-mercaptovalerate), and 1,3,5-tris(3-mercaptobutyloxyethyl)-1,3,5-triazine-2,4,6(1H, 3H, 5H)-trione.

As examples of secondary tetrathiol compounds, mention can be made of, for example, dipentaerythritol hexakis(3-mercaptobutyrate), pentaerythritol tetrakis(2-mercaptopropionate), pentaerythritol tetrakis(3-mercapto-2-propionate), pentaerythritol tetrakis(2-mercaptoisobutyrate), pentaerythritol tetrakis(4-mercaptovalerate), and pentaerythritol tetrakis(3-mercaptovalerate)

As examples of secondary hexathiol compounds, mention can be made of, for example, dipentaerythritol hexakis(3-mercaptobutyrate), dipentaerythritol hexakis(2-mercaptopropionate), dipentaerythritol hexakis(2-mercaptoisobutyrate), dipentaerythritol hexakis(4-mercaptovalerate), and dipentaerythritol hexakis(3-mercaptovalerate)

As examples of primary dithiol compounds, mention can be made of, for example, 2,2'-(ethylenedioxy)ethanethiol and ethylene glycol bis-mercaptoacetate.

As examples of primary trithiol compounds, mention can be made of, for example, trimethylolpropane tris(3-mercaptopropionate).

As examples of primary tetrathiol compounds, mention can be made of, for example, pentaerythritol tetrakis(3-mercaptopropionate).

In one embodiment of the present invention, the mercapto functional organic compound does not include a hydroxyl group.

The (B) mercapto functional compound can be mercapto functional silicone compounds having at least two thiol groups per molecule. The composition according to the present invention may comprise one type of the mercapto functional silicone compound, or may comprise two or more types of the mercapto functional silicone compounds in combination.

The structure of the mercapto functional silicone compound can be linear, branched, partial-branched, cyclic, or resinous. In one preferred embodiment of the present invention, the mercapto functional silicone compound has a linear structure.

The mercapto functional silicone compound has at least two thiol groups per molecule. The mercapto functional silicone compound may have the thiol groups at the end of the polymer chain or at silicon atoms other than the ends of the polymer chain, i.e. as pendant groups. In one preferred embodiment of the present invention, the mercapto functional silicone compound has the thiol groups at silicon atoms other than the ends of the polymer chain, i.e. as pendant groups, and does not have any thiol groups at the ends of the polymer chain.

Other silicon atom-bonded groups other than thiol groups included in the mercapto functional silicone compound may include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl and dodecyl groups; C6-12 aryl groups such as phenyl, tolyl, xylyl and naphthyl groups; benzyl group; C7-12 aralkyl groups such as phenethyl, and phenylpropyl groups; and groups obtained by substituting some or all of the hydrogen atoms in these groups with halogen atoms such as fluorine, chlorine or bromine atoms. Preferably, the silicon atom-bonded groups other than thiol groups comprise a C1-12 alkyl group, in particular a methyl group.

Specific examples of the mercapto functional silicone compound include, but are not limited to, those available under the trade name SMS-022, SMS-042, and SMS-142 from Gelest Inc, which are [(mercaptopropyl)methylsiloxane]-dimethylsiloxane copolymer, as well as KF-2001 and KF-2004 from Shin-Etsu Chemical Co. Ltd, in which some silicon atoms internal to the polymer chain, i.e., not at the termini, are substituted with mercaptoalkyl groups. Another silicone compound which can be mentioned is X-22-167B from Shin-Etsu Chemical Co. Ltd., in which both terminal silicon atoms are substituted with mercaptoalkyl groups.

The (B) mercapto functional organic compound may be present in an amount of 3% by weight or more, preferably 5% by weight or more, more preferably 6% by weight or more, even more preferably 7% by weight or more, and in particular 8% by weight or more, and may be present in an amount of 50% by weight or less, preferably 45% by weight or less, more preferably 40% by weight or less, even more preferably 35% by weight or less, and in particular 30% by weight or less, relative to the total weight of the composition.

In one embodiment of the present invention, the UV curable silicone composition comprises organopolysiloxane comprising at least one aryl group in the silicon atom-bonded groups as the (A) organopolysiloxane and the mercapto functional organic compounds as the (B) mercapto functional compound of the present invention.

In one embodiment of the present invention, the UV curable silicone composition comprises organopolysiloxane not comprising any aryl groups in the silicon atom-bonded groups as the (A) organopolysiloxane and the mercapto functional silicone compounds as the (B) mercapto functional compound of the present invention.

(C) Photopolymerization Initiator

The UV curable silicone composition according to the present invention comprises at least one photopolymerization initiator as the component (C). The composition according to the present invention may comprise one type of the (C) photopolymerization initiator, or may comprise two or more types of the (C) photopolymerization initiator in combination.

The type of the (C) photopolymerization initiator is not particularly limited, but can be selected from alkylphenone-type photopolymerization initiators, acylphosphine oxide-type photopolymerization initiators, intramolecular hydrogen abstraction-type photopolymerization initiators, and oxime ester-type photopolymerization initiators.

The alkylphenone-type photopolymerization initiators may be selected from, for example, hydroxyalkylphenones, such as 1-hydroxycyclohexyl-phenylketone, which is sold by IGM RESINS B.V. under the name of Omnirad 184; hydroxyacetophenones, such as 2-hydroxy-2-methyl-1-phenyl-1-propanone, which is sold by IGM RESINS B.V. under the name of Omnirad 1173, 2-hydroxy-4'-(2-hydroxyethoxy)-2-methylpropiophenone, which is sold by IGM RESINS B.V. under the name of Omnirad 2959, oligo-[2-hydroxy-2-methyl-1-[4-(1-methylvinyl)-phenyl]-propanone], and 1,1'-(methylene-di-4,1-phenylene) bis[2-hydroxy-2-methyl-1-propanone], which is sold by IGM RESINS B.V. under the name of Omnirad 127; and aminoacetophenones, such as 2-methyl-1-[4-(methylthio)phenyl]-2-(4-morpholinyl)-propane-1-one, which is sold by IGM RESINS B.V. under the name of Omnirad 907, 2-dimethylamino-2-(4-methylbenzyl)-1-(4-morpholine-4-yl-phenyl)-butane-1-one, which is sold by IGM RESINS B.V. under the name of Omnirad 379EG, 2-benzyl-2-dimethylamino-1-(3, 4-dimethoxy-phenyl)-butane-1-one, 2-benzyl-2-dimethylamino-1-(4-morpholine-4-yl-phenyl)-butane-1-on, 2-(dimethylamino)-1-(4-morpholinophenyl)-2-benzyl-1-butanone, which is sold by IGM RESINS B.V. under the name of Omnirad 369, and 2-methyl-1-(4-methylsulfanyl-phenyl)-2-morpholine-4-yl-propane-1-one; 2,2-dimethoxy-2-phenylacetophenone, 4-phenoxydichloro acetophenone, 4-t-butyl-dichloroacetophenone, 4-t-butyltrichloroacetophenone and a combination thereof.

The acylphosphine oxide-type photopolymerization initiators may be selected from, for example, (2,4,6-trimethylbenzoyl)-diphenyl-phosphine oxide, which is sold by IGM RESINS B.V. under the name of Omnirad TPO-H, phenyl-(2,4,6-trimethylbenzoyl)-phosphoric acid ethyl ester, which is sold by IGM RESINS B.V. under the name of Omnirad TPO-L, and bis(2,4,6-trimethylbenzoyl)phenylphosphine oxide, which is sold by IGM RESINS B.V. under the name of Omnirad 819, bis(2,6-dimethoxybenzoyl)-2,4,4-trimethyl-pentylphosphine oxide, and a combination thereof.

The intramolecular hydrogen abstraction-type photopolymerization initiators may be selected from, for example, oxyphenyl-type photopolymerization initiators such as methylbenzoylformate, which is sold by IGM RESINS B.V. under the name of Omnirad MBF.

In particular, the photopolymerization initiator may comprise an oxyethoxy phenylacetyl derivative, which also corresponds to an intramolecular hydrogen abstraction-type photopolymerization initiator. As the specific example of the oxyethoxy phenylacetyl derivative, mention can be made of a blend of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester, which is sold by IGM RESINS B.V. under the name of Omnirad 754, and a combination thereof.

The oxime ester-type photopolymerization initiators may be selected from, for example, 1-[4-(phenylthio) phenyl]-1, 2-octanedione-2-(o-benzoyloxime), which is sold by BASF under the name of Irgacure OXE-01, 1-[9-ethyl-6-(2-methylbenzoyl)-9H-carbazol-3-yl]ethanone-1-(o-acetyloxime), which is sold by BASF under the name of Irgacure OXE-02, and a combination thereof.

In one specific embodiment of the present invention, the (C) photopolymerization initiator is preferably selected from intramolecular hydrogen abstraction-type photopolymerization initiators. In another specific embodiment of the present invention, the (C) photopolymerization initiator comprises only intramolecular hydrogen abstraction-type photopoly-merization initiators, and does not comprise other photopo-lymerization initiators.

In one specific embodiment of the present invention, the (C) photopolymerization initiator does not include any phos-phorous atom.

The (C) photopolymerization initiator may be present in an amount of 0.001% by weight or more, preferably 0.005% by weight or more, more preferably 0.01% by weight or more, and even more preferably 0.05% by weight or more, and may be present in an amount of 5% by weight or less, preferably 3% by weight or less, more preferably 2% by weight or less, and even more preferably 1.5% by weight or less, relative to the total weight of the composition.

(D) Polymerization Inhibitor and/or Antioxidant

The UV curable silicone composition according to the present invention comprises either or both of at least one photopolymerization initiator as the component (d-1) and/or at least one antioxidant as the component (d-2).

(d-1) Photopolymerization Inhibitor

The (d-1) photopolymerization inhibitor may comprise one type of photopolymerization inhibitor, or may comprise two or more types of photopolymerization inhibitors in combination.

The (d-1) photopolymerization inhibitor of the present invention comprises at least one alkoxylated polyol derived (meth)acrylate or at least one quinone derivative compound.

The alkoxylated polyol derived (meth)acrylate may be mono-functional, bi-functional, tri-functional, or tetra-func-tional.

The polyol moiety of the alkoxylated polyol derived (meth)acrylate may be selected from di- to octa-hydric polyols. Examples of the di- to octa-hydric polyols include dihydric alcohols, such as ethylene glycol, propylene glycol, butylene glycol, hexamethylene glycol, and neopentyl gly-col; trihydric alcohols, such as glycerol, trioxyisobutane, 1,2,3-butanetriol, 1,2,3-pentanetriol, 2-methyl-1,2,3-propa-netriol, 2-methyl-2,3,4-butanetriol, 2-ethyl-1,2,3-butanet-riol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolethane, and trimethylolpropane; tetrahydric alcohols, such as pentaerythritol, 1,2,3,4-penta-netetrol, 2,3,4,5-hexanetetrol, 1,2,4,5-pentanetetrol, and 1,3,4,5-hexanetetrol.

The alkoxylated portion of the alkoxylated polyol derived (meth)acrylate may be selected from methoxylated portion, ethoxylated portion, butoxylated portion, and propoxylated portion. A repeat number of the alkoxylated portion in the alkoxylated polyol derived (meth)acrylate is not particularly limited, but is in general 1 to 30, preferably 1 to 20, more preferably 1 to 10, and even more preferably from 1 to 5.

As the mono-functional alkoxylated polyol derived (meth)acrylate, mention can be made of methoxyethylene glycol acrylate, methoxypolypropylene glycol acrylate, methoxypolyethylene glycol acrylate, ethoxydiethylene gly-col acrylate, and neopentyl glycol propoxylate methylether monoacrylate.

As the bi-functional alkoxylated polyol derived (meth) acrylate, mention can be made of alkoxylated neopentyl glycol diacrylate, such as ethoxylated neopentyl glycol diacrylate, and propoxylated neopentyl glycol diacrylate.

As the tri-functional alkoxylated polyol derived (meth) acrylate, mention can be made of ethoxylated trimethylol-propane triacrylate, propoxylated trimethylolpropane tria-crylate, and propoxylated glycerol triacrylate.

As the tetra-functional alkoxylated polyol derived (meth) acrylate, mention can be made of ethoxylated pentaerythritol tetraacrylate.

The quinone derivative compound may be quinone methide compounds. As one specific embodiment of the quinone methide compounds, mention can be made of 2,6-bis(1,1-dimethylethyl)-4-(phenylenemethylene)cyclo-hexa-2,5-dien-1-one, which is sold under the name of Irgastab® UV22 sold by BASF.

The (d-1) photopolymerization inhibitor may be present in an amount of 0.001% by weight or more, preferably 0.005% by weight or more, more preferably 0.01% by weight or more, and even more preferably 0.03% by weight or more, and may be present in an amount of 10% by weight or less, preferably 5% by weight or less, more preferably 3% by weight or less, and even more preferably 2% by weight or less, relative to the total weight of the composition.

(d-2) Antioxidant

The (d-2) antioxidant may comprise one type of antioxi-dant, or may comprise two or more types of antioxidants in combination.

Such an antioxidant is not particularly limited, but may include a hindered phenol-type antioxidant, a phosphorus-type antioxidant, a lactone-type antioxidant, a hydroxylam-ine-type antioxidant, a vitamin E-type antioxidant, and a sulfur-based antioxidant.

As the hindered phenol-type antioxidant, mention can be made of triethylene glycol-bis [3-(3-tert-butyl-5-methyl-4-hydroxyphenyl)propionate], which is available from BASF in the name of IRGANOX 245, 1,6-hexanediol-bis[3-(3,5-di-tert-butyl-4-hydroxyphenyl)propionate, which is avail-able from BASF in the name of IRGANOX 259, 4-bis-(n-octylthio)-6-(4-hydroxy-3,5-di-tert-butylanilino)-1,3,5-triazine, which is available from BASF in the name of IRGANOX 565, pentaerythrityl-tetrakis[3-(3,5-di-tert-butyl-4-hydroxyphenyl)propionate, which is available from BASF in the name of IRGANOX 1010, 2,2-thio-diethylen-ebis [3-(3,5-di-tert-butyl-4-hydroxyphenyl)propionate], which is available from BASF in the name of IRGANOX 1035, octadecyl-3-(3,5-di-tert-butyl-4-hydroxyphenyl)pro-pionate, which is available from BASF in the name of IRGANOX 1076, N,N'-hexamethylenebis(3,5-di-tert-butyl-4-hydroxyhydrocinnamide), which is available from BASF in the name of IRGANOX 1098, 3,5-ditert-butyl-4-hydroxy-benzylphosphonate-diethyl ester, which is available from BASF in the name of IRGAMOD 295, 1,3,5-trimethyl-2,4,6-tris(3,5-di-tert-butyl-4-hydroxybenzyl)benzene, which is available from BASF in the name of IRGANOX 1330, tris-(3,5-di-tert-butyl-4-hydroxybenzyl)isocyanurate, which is available from BASF in the name of IRGANOX 3114, octylated diphenylamine, which is available from BASF in the name of IRGANOX 5057, 2,4-bis[(octylthio)methyl]-o-cresol, which is available from BASF in the name of IRGANOX 1520L, isooctyl-3-(3,5-di-tert-butyl-4-hydroxy-phenylpropionate, which is available from BASF in the name of IRGANOX 1135, 2,4-bis(dodecylthiomethyl)-6-methylphenol, which is available from BASF in the name of IRGANOX 1726, 2,5,7,8-tetramethyl-2-(4,8,12-trimethyl-tridecyl)chroman-6-ol, which is available from BASF in the name of IRGANOX E201, and 5,7-di-tert-butyl-3-(3,4-di-methylphenyl)benzofuran-2(3H)-one which is available from BASF in the name of IRGANOX HP-136, and com-binations thereof.

As the phosphorus-type antioxidant, mention can be made of tris(2,4-di-tert-butylphenyl) phosphite, which is available from BASF in the name of IRGAFOS 168, tris[2-[[2,4,8,10-tetrakis(1,1-dimethylethyl)dibenzo[d,f] [1,3,2]dioxaphosphepin-6-yl]oxy] ethyl]amine, which is available from
BASF in the name of IRGAFOS 12, bis(2,4-di-tert-butyl-
6-methylphenyl) ethyl phosphite, which is available from
BASF in the name of IRGAFOS 38, and biphenyl-4,4'-diyl-
bis[bis(2,4-di-tert-butyl-5-methylphenoxy)phosphine],
which is available from Osaki Industry in the name of
GSY-P1O1, and combinations thereof.

As the lactone-type antioxidant, mention can be made of
a reaction product of 3-hydroxy-5,7-di-tert-butyl-furan-2-
one with o-xylene (CAS No, 181314-48-7).

As the hydroxylamine-type antioxidant, mention can be
made of an oxidation product of alkylamine of which the
raw material is a reduced beef tallow and the like.

As the vitamin E type antioxidant, mention can be made
of 3,4-dihydro-2,5,7,8-tetramethyl-2-(4,8,12-trimethyltri-
decyl)-2H-benzopyran-6-ol.

As the sulfur-based antioxidant, mention can be made of
didodecyl 3,3-thiobispropionate, which is available from
BASF in the name of IRGANOX PS800, and dioctadecyl
3,3-thiobispropionate, which is available from BASF in the
name of IRGANOX PS802.

In one preferred embodiment of the present invention, the
antioxidant is selected from hindered phenol-type antioxi-
dants. In another preferred embodiment of the present inven-
tion, the hindered phenol-type antioxidant can be repre-
sented by the following formula (II):
(II): in which, R1 and R3 represent, independently of each
other, a linear or branched, saturated or unsaturated alkyl
group, preferably having 4 or more carbon atoms, more
preferably having 5 to 16 carbon atoms, and even more
preferably having 6 to 12 carbon atoms, which is optionally
interrupted by at least one heteroatom, such as O, S, and N;
R2 represents an alkyl group, preferably an alkyl group
having 1 to 3 carbon atoms, and more preferably a methyl
group.

In formula (II), R1 and R3 preferably represent a linear
and saturated alkyl group. Preferably, R1 and R3 in formula
(II) represent an alkyl group interrupted by at least one
carbonyl group (—OC—), carbonyloxy group (—OC—
O—), and/or a sulfur atom (—S—).

In one particular embodiment of the present invention, the
(d-2) antioxidant is hindered phenol-type antioxidants com-
prising at least two thioester groups, i.e. thioester antioxi-
dant, such as 2,4-bis [(octylthio)methyl)-o-cresol, which is
available from BASF in the name of IRGANOX 1520L.

As other examples of the (d-2) antioxidants, the following
commonly used antioxidants can also be included: phenols
such as 4-methoxy phenol, 4-tert-butylcatechol, or 2,6-di-
tert-butyl-4-methylphenol (BHT); hydroquinones such as
1,4-dihyrdroxybenzene or 3,5-di-tert-butylbenzene-1,2-diol;
quinones such as 1,4-benzoquinone or naphthalene-1,2-
dione; aromatic nitro compounds such as 1,3-dinitrobenzene
or 1,4-dinitrobenzene; nitrophenols such as 2-(sec-butyl)-4,
6-dinitrophenol, 4-methyl-2-nitrophenol, or 4-methyl-2,6-
dinitrophenol; amines such as phenothiazine, N1-phenyl-
N4-propylbenzene-1,4-diamine, N-(1,4-dimethylpentyl)-N'
phenyl-p-phenylenediamine, N,N-diethylhydroxylamine, or
2,2,6,6-tetramethylpiperidine; nitroso compounds such as
N-nitrosophenylhydroxylamine ammonium salt; nitroxide
compounds such as bis(1-oxyl-2,2,6,6-tetramethylpiperidin-
4-yl) sebacate, 1-oxyl-2,2,6,6-tetramethylpiperidine,
1-oxyl-2,2,6,6-tetramethylpiperidin-4-ol, 1-oxyl-2,2,6,6-te-
tramethyl-4-n-butoxypiperidine; and mixtures thereof.

The (d-2) antioxidant may be present in an amount of
0.01% by weight or more, preferably 0.05% by weight or
more, more preferably 0.1% by weight or more, and even
more preferably 0.2% by weight or more, and may be present in an amount of 5% by weight or less, preferably 3%
by weight or less, more preferably 2% by weight or less, and
even more preferably 1% by weight or less, relative to the
total weight of the composition.

In one embodiment of the present invention, the UV
curable silicone composition comprises a relatively large
amount of the (C) at least one photopolymerization initiator;
and (d-2) at least one antioxidant. In this embodiment, it was
discovered that the large amount of the (d-2) antioxidant can
suppress a coloration of cured silicone product and thus
provide a clear cured silicone product.

In this embodiment, the (d-1) polymerization inhibitor
preferably comprises alkoxylated polyol derived (meth)
acrylate, and/or the (d-2) antioxidant preferably comprises at
least one hindered phenol-type antioxidant comprising at
least two thioester groups, i.e. thioester antioxidant, such as
2,4-bis [(octylthio)methyl)-o-cresol, which is available from
BASF in the name of IRGANOX 1520L.

In this embodiment, the amount of the (C) photopolymer-
ization initiator is preferably 0.1% by weight or more,
preferably 0.5% by weight or more, more preferably 0.7%
by weight or more, and even more preferably 0.1% by
weight or more, and may be 5% by weight or less, preferably
3% by weight or less, more preferably 2% by weight or less,
and even more preferably 1.5% by weight or less, relative to
the total weight of the composition.

In this aspect, the amount of the (d-2) antioxidant is
preferably 0.1% by weight or more, preferably 0.3% by
weight or more, more preferably 0.5% by weight or more,
and even more preferably 0.7% by weight or more, and may
be 5% by weight or less, preferably 3% by weight or less,
more preferably 2% by weight or less, and even more
preferably 1.5% by weight or less, relative to the total weight
of the composition.

(E) Cyclic Organopolysiloxane

The UV curable silicone composition according to the
present invention may comprise at least one cyclic organ-
opolysiloxane as a component (E). The composition accord-
ing to the present invention may comprise one type of the
(E) cyclic organopolysiloxane, or may comprise two or more
types of the (E) cyclic organopolysiloxane.

The cyclic organopolysiloxane can be represented by the
following formula (III): (R22SiO)n, in which, R2 is inde-
pendently a halogen-substituted or unsubstituted monova-
lent hydrocarbon group, and n is a number so that the cyclic
organopolysiloxane exhibits a viscosity of 1000 mPa or less
at 25° C. The viscosity can be measured with a rotational
viscometer conforming to JIS K7117-1.

In formula (III), the monovalent hydrocarbon of R2,
which can be optionally substituted with at least one halo-
gen, may include, C1-12 alkyl groups such as methyl, ethyl,
propyl, isopropyl, butyl, isobutyl, tert-butyl, pentyl, neopen-
tyl, hexyl, cyclohexyl, heptyl, octyl, nonyl, decyl, undecyl
and dodecyl groups; C6-12 aryl groups such as phenyl, tolyl,
xylyl and naphthyl groups; benzyl group; C7-12 aralkyl
groups such as phenethyl, and phenylpropyl groups; C2-12
alkenyl groups, such as a vinyl, allyl, butenyl, pentenyl,
hexenyl, heptenyl, octenyl, nonenyl, decenyl, undecenyl,
and dodecenyl groups; and groups obtained by substituting
some or all of the hydrogen atoms in these groups with
halogen atoms such as fluorine, chlorine or bromine atoms.
The monovalent hydrocarbon in R2 may include a small
amount of hydroxyl group or alkoxy group such as methoxy
or ethoxy group, provided that this does not adversely affect
the aim of the present invention. Preferably, the monovalent hydrocarbon in R2 represents a C1-12 alkyl group, in particular a methyl group, and a C2-12 alkenyl groups, in particular a vinyl group.

In one embodiment of the present invention, the cyclic organopolysiloxane may comprise at least two alkenyl groups per molecule. When the cyclic organopolysiloxane comprises at least two alkenyl groups per molecule, the amount of the alkenyl groups in the cyclic organopolysiloxane is not particularly limited, but may be, for example, 10 mol % or more, preferably 20 mol % or more, and more preferably 30 mol % or more, and in general 80 mol % or less, preferably 70 mol % or less, and more preferably 60 mol % or less, relative to the total amount of the silicon atom-bonded groups. The amount of the alkenyl groups can be measured, for example, with analytical methods such as Fourier transform infrared spectroscopy (FT-IR) or nuclear magnetic resonance (NMR), or the above titration method.

The (E) cyclic organopolysiloxane may be present in an amount of 2.5% by weight or more, preferably 5% by weight or more, more preferably 7.5% by weight or more, and in particular 10% by weight or more, and may be present in an amount of 30% by weight or less, preferably 25% by weight or less, more preferably 20% by weight or less, and in particular 15% by weight or less, relative to the total weight of the composition.

The UV curable silicone composition according to the present invention may also comprise any optional additive(s) usually used in the field, chosen, for example, from organopolysiloxanes other than components (A) and (B) above, organic or inorganic fillers, pigments, adhesion-imparting agents, resistance imparting agent, releasing agents, heat resistance agents, dyes, flame retardancy imparting agents, and mixtures thereof.

The UV curable silicone composition according to the present invention can be prepared by mixing the above-described essential and optional components in a conventional manner. The mixing method of each components can be conducted with a conventionally known method and is not particularly limited. For example, the mixing is carried out by simple stirring or mixing using a mixing device, such as a uniaxial or biaxial continuous mixer, a double roll, a hobert mixer, a dental mixer, a planetary mixer, a kneader mixer, and a Henschel mixer.

The present invention also relates to a sealing agent or a sheet film obtained by curing the UV curable silicone composition according to the present invention. The sealing agent of the present invention is preferably used for sealing a semiconductor element including an optical semiconductor. The sheet film of the present invention is preferably used as a sealing material layer or an adhesive sheet film for mass transfer process.

Examples of the semiconductor element include SiC, GaN, and the like. Examples of the optical semiconductor element include elements represented by light-emitting diodes (LED), photo diodes, photo transistors, laser diodes, and the like.

The sealing agent or sheet film according to the present invention is obtained by, for example, applying the UV curable silicone composition of the present invention on a film, tape, or sheet substrate, and then irradiating the UV curable silicone composition with UV rays to cure, and a cured film on the surface of the substrate is obtained. The film thickness of the cured film is not particularly limited, but is preferably in the range of 1 um to 10 mm or in the range of 5 um to 5 mm.

In the present specification, the term "UV" means electromagnetic radiation having a wavelength of about 10 nm to about 400 nm, and in ultraviolet curing, a wavelength of 280 nm to 400 nm can be employed. Examples of a device that generates UV rays include a high-pressure mercury lamp, a medium-pressure mercury lamp, and an ultraviolet LED. The irradiance level of UV rays is not particularly limited, but is preferably 1 to 1,000 mW/cm2, more preferably 5 to 500 mW/cm2, and even more preferably 10 to 200 mW/cm2 at 365 nm.

The present invention will be described in more detail by way of examples which however should not be construed as limiting the scope of the present invention.

The UV curable silicone compositions of the present invention will be described in detail by examples and comparative examples. In the examples and comparative examples, the following components were used to prepare the UV curable silicone compositions in the examples and comparative examples. In the formulae, Vi indicates a vinyl group, Me indicates a methyl group, and Ph indicates a phenyl group. The numerical values for the amounts of the components shown in the tables are all based on "part by weight" as active raw materials.

Components:

- (a-1): organopolysiloxane resin having at least two alkenyl groups per molecule, represented by the average unit formula: (Me3SiO1/2)0.05(Me2ViSiO1/2)0.17 (MeSiO3/2)0.39 (PhSiO3/2)0.39
- (a-2): organopolysiloxane resin having at least two alkenyl groups per molecule, represented by the average unit formula: (Me3SiO1/2)0.4(Me2ViSiO1/2)0.3 (SiO4/2)0.5
- (a-3): vinylmethylsiloxane resin having at least two alkenyl groups per molecule (product name: MTV-112, obtained from GELEST, INC)
- (a-4): linear organopolysiloxane, represented by the formula: ViMe2SiO(Me2SiO2/2)310SiMe2Vi
- (b-1): 1,4-bis(3-mercaptobutylyloxy)butane (product name: Karenz MT® BD1, Showa Denko)
- (b-2): [(Mercaptopropyl)Methylsiloxane]-Dimethylsiloxane Copolymer (product name: SMS-142, Gelest)
- (c-1): a blend of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester (product name: Omnirad 754, obtained from IGM RESINS B.V.)
- (c-2): 2-hydroxy-2-methyl-1-phenyl-1-propanone (product name: Omnirad 1173, obtained from IGM RESINS B.V.)
- (c-3): 1-hydroxycyclohexyl-phenylketone (product name: Omnirad 184, obtained from IGM RESINS B.V.)
- (c-4): bis(2,4,6-trimethylbenzoyl)phenylphosphine oxide (product name: Omnirad 819, obtained from IGM RESINS B.V.)
- (c-5): 2-dimethylamino-2-(4-methylbenzyl)-1-(4-morpholine-4-yl-phenyl)-butane-1-one (product name: Omnirad 379EG, obtained from IGM RESINS B.V.)
- (c-6): phenyl-(2,4,6-trimethylbenzoyl)-phosphoric acid ethyl ester (product name: Omnirad TPO-L, obtained from IGM RESINS B.V.)
- (c-7): 2-methyl-1-[4-(methylthio)phenyl]-2-(4-morpholinyl)-propane-1-one (product name: Omnirad 907, obtained from IGM RESINS B.V.)
- (c-8): 1,1'-(methylene-di-4,1-phenylene) bis[2-hydroxy-2-methyl-1-propanone] (product name: Omnirad 127, obtained from IGM RESINS B.V.)
- (d-1-1): propoxylated glycerol (1PO/OH) triacrylate (product name: Genorad 16, obtained from Rahn)

(d-1-2): 2,6-di-tert-butyl-4-(phenylmethylidene)cyclo-hexa-2,5-dien-1-one (product name: obtained from Irgastab UV22, obtained from BASF)

(d-1-3): Tinuvin 123 (obtained from BASF)

(d-1-4): Tinuvin 292 (obtained from BASF)

(d-1-5): Omnistab 123 (obtained from IGM RESINS B.V.)

(d-1-6): Genorad 24

(d-1-7): TBT-100

(d-2-1): 2,4-bis[(octylthio)methyl]-o-cresol (product name: IRGANOX 1520L, obtained from BASF)

(d-2-2): 2,6-di-tert-butyl-4-methylphenol (e): cyclic organopolysiloxane represented by a formula (MViSiO)4, The obtained UV curable composition were kept at 25° C. for 5 hours, then whether gelation occurred or not was observed. Compositions in which gelation did not occur is shown as "OK".

The UV curable silicone composition was filled into a mold having a concavity with a predetermined shape and was irradiated from the liquid surface at the top with ultraviolet light using a high-pressure mercury lamp in a manner where the cumulative radiation was 1000 mJ/cm2. The obtained plate-like cured product having a thickness of 2 mm was subjected to transmittance measurement at 450 nm at 25° C. The cured product having a transmittance of 89% or more is shown as "Clear".

The results are summarized in the tables below.

TABLE 1

| Components | Ex. 1 | Ex. 2 | Ex. 3 | Ex. 4 | Ex. 5 | Comp. Ex. 1 |
|---|---|---|---|---|---|---|
| a-1 | 60.5 | 60.5 | 60.5 | 60.5 | 60.5 | 60.5 |
| b-1 | 27.0 | 27.0 | 27.0 | 27.0 | 27.0 | 27.0 |
| c-2 | 0.1 | 0.1 | 1.0 | 1.0 | 1.0 | 0.1 |
| d-1-1 | 0.2 | 0.4 | 1.0 | 2.0 | — | — |
| d-1-2 | — | — | — | — | 0.1 | — |
| d-2-1 | — | — | 0.4 | — | — | — |
| e | 12.4 | 12.4 | 12.4 | 12.4 | 12.4 | 12.4 |
| Evaluation | | | | | | |
| Gelation | OK | OK | OK | OK | OK | NG |

TABLE 2

| Components | Ex. 6 | Ex. 7 | Comp. Ex. 2 | Comp. Ex. 3 | Comp. Ex. 4 | Comp Ex. 5 |
|---|---|---|---|---|---|---|
| a-2 | 41.4 | — | 41.4 | 41.4 | 41.4 | — |
| a-4 | — | 90.7 | — | — | — | 90.7 |
| a-3 | 32.6 | — | 32.6 | 32.6 | 32.6 | — |
| b-2 | 25 | 8.3 | 25 | 25 | 25 | 8.3 |

TABLE 2-continued

| Components | Ex. 6 | Ex. 7 | Comp. Ex. 2 | Comp. Ex. 3 | Comp. Ex. 4 | Comp Ex. 5 |
|---|---|---|---|---|---|---|
| c-2 | 1 | 1 | 1 | 1 | 1 | 1 |
| d-1-1 | — | 0.05 | — | — | — | — |
| d-1-2 | 0.05 | — | — | 0.1 | — | — |
| d-1-3 | — | — | 0.05 | — | — | — |
| d-1-4 | — | — | — | 0.05 | — | — |
| d-1-5 | — | — | — | — | 0.05 | — |
| Evaluation | | | | | | |
| Gelation | OK | OK | NG | NG | NG | NG |

TABLE 3

| Components | Comp. Ex. 6 | Ex. 8 | Comp. Ex. 7 |
|---|---|---|---|
| a-2 | 40.7 | 40.7 | 40.7 |
| a-3 | 33.3 | 33.3 | 33.3 |
| b-2 | 25 | 25 | 25 |
| c-2 | 1 | 1 | 1 |
| d-1-1 | — | 0.05 | — |
| d-1-6 | — | — | 0.05 |
| d-1-7 | 0.05 | — | — |
| Evaluation | | | |
| Gelation | NG | OK | NG |

As can see from the results from Tables 1 to 3, these embodiments of the UV curable silicone composition according to the present invention, which comprises at least one polymerization inhibitor comprising at least one alkoxylated polyol derived (meth)acrylate or at least one quinone derivative compound, can suppress the gelation of the composition. Therefore, these embodiments of the present invention can provide UV curable silicone compositions which is stable and have a long pot-life even though they include mercapto functional compounds.

TABLE 4

| Components | Ex. 9 | Ex. 10 |
|---|---|---|
| a-1 | 60.5 | 60.5 |
| b-1 | 27.0 | 27.0 |
| c-2 | 1.0 | 1.0 |
| d-1-1 | 1.0 | 1.0 |
| d-2-1 | 0.4 | 0.9 |
| e | 12.4 | 12.4 |
| Evaluation | | |
| Gelation | OK | OK |
| Coloration after UV cure | Clear | Clear |

TABLE 5

| Components | Ex. 11 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| a-1 | 60.5 | 60.5 | 60.5 | 60.5 | 60.5 | 60.5 | 60.5 | 60.5 |
| b-1 | 27 | 27.0 | 27.0 | 27.0 | 27.0 | 27.0 | 27.0 | 27.0 |
| c-1 | 0.1 | | | | | | | |
| c-2 | — | 0.1 | — | — | — | — | — | — |
| c-3 | — | — | 0.1 | — | — | — | — | — |
| c-4 | — | — | — | 0.1 | — | — | — | — |
| c-5 | — | — | — | — | 0.1 | — | — | — |
| c-6 | — | — | — | — | — | 0.1 | — | — |

TABLE 5-continued

| Components | Ex. 11 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| c-7 | — | — | — | — | — | — | 0.1 | — |
| c-8 | — | — | — | — | — | — | — | 0.1 |
| d-2-2 | 0.1 | 0.1 | 0.1 | 0.1 | 0.1 | 0.1 | 0.1 | 0.1 |
| e | 12.4 | 12.4 | 12.4 | 12.4 | 12.4 | 12.4 | 12.4 | 12.4 |
| Evaluation | | | | | | | | |
| Gelation | OK | OK | OK | OK | OK | OK | OK | OK |
| Coloration after UV cure | Clear | Pinkish | Pinkish | Yellowing | Yellowing | Yellowing | Yellowing | Pinkish/ Yellowing |

As can see from the results from Tables 4 and 5, these embodiments of the UV curable silicone composition according to the present invention can suppress coloration of UV cured compositions, as well as the gelation of the composition. Therefore, these embodiments of the present invention can provide clear cured products by UV radiation, in addition to stable UV curable silicone compositions having a long pot-life.

What is claimed is:

1. A UV curable silicone composition comprising:
   (A) at least one organopolysiloxane having at least two alkenyl groups per molecule;
   (B) at least one mercapto functional compound having at least two thiol groups per molecule;
   (C) at least one photopolymerization initiator; and
   (D) (d-1) at least one polymerization inhibitor comprising at least one alkoxylated polyol derived (meth) acrylate or at least one quinone methide compound, and/or (d-2) at least one antioxidant, wherein,
      (i) the (C) at least one photopolymerization initiator is selected from intramolecular hydrogen abstraction type photopolymerization initiators and the (d-2) at least one antioxidant is present, or
      (ii) the (d-1) at least one polymerization inhibitor is present;
   wherein the (d-2) at least one antioxidant is chosen from a phenol, a hydroquinone; a quinone, an aromatic nitro compound; a nitrophenol, an amine; a nitroso compound; a nitroxide compound, and combinations thereof.

2. The composition according to claim 1, wherein the mercapto functional compound comprises primary or secondary thiol groups.

3. The composition according to claim 1, wherein the mercapto functional compound comprises a dithiol compound.

4. The composition according to claim 1, wherein the intramolecular hydrogen abstraction type photopolymerization initiator comprises an oxyethoxy phenylacetyl derivative.

5. The composition according to claim 1, wherein the mercapto functional organic compound is present in an amount of 3% by weight or more and 50% by weight or less relative to the total weight of the composition.

6. The composition according to claim 1, wherein the antioxidant is a hindered phenol-type antioxidant.

7. A sealing agent or sheet film formed with the UV curable silicone composition according to claim 1.

8. The composition according to claim 6, wherein the hindered phenol-type antioxidant comprises a thioester group to form a thioester antioxidant.

9. The composition according to claim 8, wherein the thioester antioxidant comprises at least two thioester groups.

10. The composition according to claim 1 comprising (d-1) and (d-2).

* * * * *